(No Model.)
C. F. PIKE.
APPARATUS FOR ABSORBING SEWER GAS IN WATER CLOSETS.
No. 271,359. Patented Jan. 30, 1883.
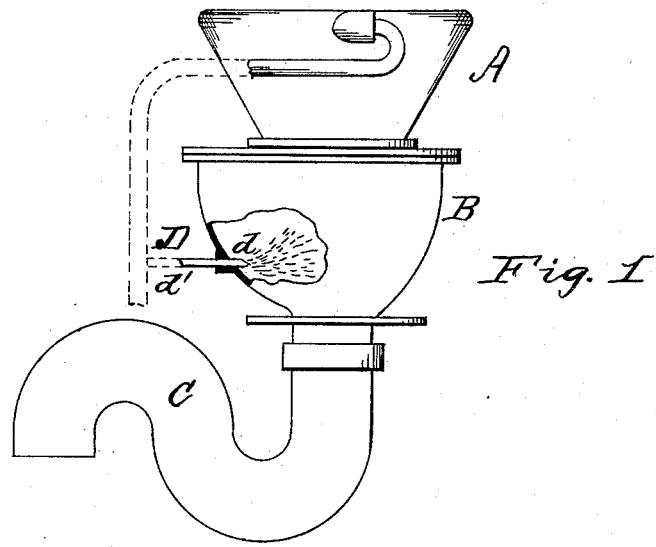
Fig. 1.
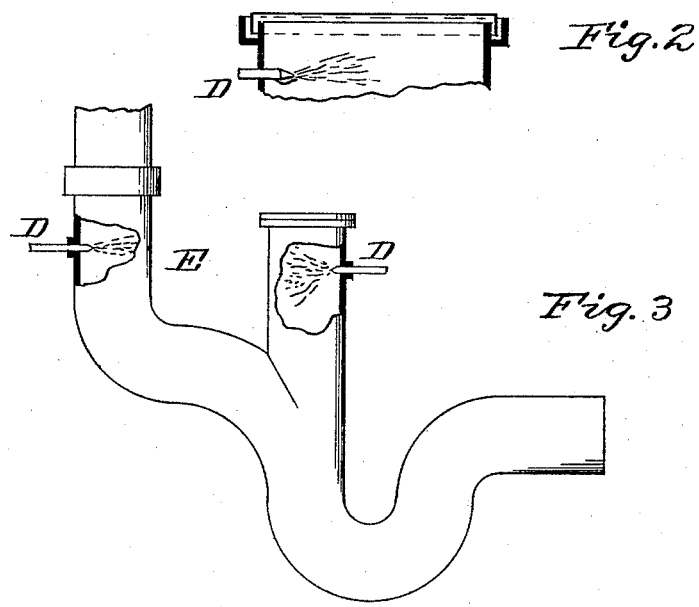
Fig. 2.
Fig. 3.
Witnesses:
W. H. Van Horn
Charles H Miller
Inventor
Charles F. Pike
By S. J. Vanstavoren
Attorney.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

APPARATUS FOR ABSORBING SEWER-GAS IN WATER-CLOSETS.

SPECIFICATION forming part of Letters Patent No. 271,359, dated January 30, 1883.

Application filed July 27, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Apparatus for Absorbing Sewer-Gas in Water-Closets, of which the following is a specification, reference being had therein to the accompanying drawings, wherein—

Figure 1 is an elevation, partly sectional, showing the application of my invention to a water-closet container or receiver. Fig. 2 is a broken section of a water-closet bowl, with sealing-groove and cap, with my improvements affixed thereto; and Fig. 3 is an elevation, partly in section, illustrating the application of my invention to soil or other pipe and traps.

My invention relates to means for preventing the escape of sewer-gas from water-closets, bath-tubs, lavatories, wash-tubs, soil-pipes, traps, &c.

My invention is based upon the principle of absorption of gas by means of a liquid injected into the fixture or closet. It is well known that water and other fluids possess the capability of absorbing a certain amount of sewer-gas, and the greater the surface of water or other fluid exposed to the gas the more abundant the absorption. It is also well known that water or any other fluid in a sprayed or atomized condition exposes an increased extent of surface or area to the gas to be absorbed; consequently if atomized water or any other suitable fluid is brought in contact with sewer-gas confined in a closet or trap such gas will be more readily absorbed and taken up in greater proportion than it would otherwise be if such water were permitted to run into such fixtures in a solid stream or flow.

My invention therefore consists in the provision of means, as hereinafter described, for injecting into the bowl, container, or trap of the water-closet, or into the soil-pipe, its trap and other traps, a spray of water or any other fluid in an atomized condition suitable for the purpose desired.

Referring to the accompanying drawings, A represents a water-closet bowl, B its container or receiver, and C the trap therefor.

D represents a pipe leading into the retainer. Its end $d$ terminates in a tapering perforated or slotted outlet or nozzle to produce a spraying or a fan-like stream, or an atomization of the water or other fluid, as shown. The other end, $d'$, of such pipe is connected in any suitable manner to the flushing-pipe or water-supply of the water-closet, &c.; or it may lead to a reservoir or pump. Any sewer-gas passing through trap C into retainer B comes in intimate contact or commingles with the atoms of water or other fluid injected thereinto and is absorbed thereby. Such water or fluid and its absorbed gas falls into the trap C and passes off through the soil-pipe to the sewer. The water or other fluid may be continuously injected into the receiver, or at intervals of a greater or less duration. If desired, such water or fluid may be mixed with a disinfecting material, either in a fluid or powdered state; or a semi-fluid disinfectant material may be substituted for the water or fluid, or disinfectant in a dry and powdered condition may be used in lieu thereof.

In Fig. 2 I have shown the application of my invention to that class of water-closets wherein no container is employed and the bowl is sealed at its top edge. In such closets the water or equivalent fluid or material is injected into the bowl A.

In closets having no container or sealing-cap the injecting device may be secured to or inserted in the bowl or in the trap, as desired.

In Fig. 3 I have shown a soil or other pipe, E, provided with the injecting or atomizing devices.

It will be noticed that the sprayed water is independent of the flushing-water for the bowl, such spray being injected into the parts of the closet during the intervals of disuse as well as at the periods of use.

I am aware that flushing-water for the bowls of water-closets has been sprayed into the bowl; but such spray is merely momentary, and is only effected at the time the bowl is flushed. It is used to wash the sides or walls of the bowl and to effect a passage of the fecal matter through the trap below. My invention does not comprehend such flushing-spray.

I am aware that an unbroken film of water has been employed to seal the aperture of urinals, as set forth in patent to Burton, No.

156,980; but such seal is designed to form a duct for conveying the sewer-gas or urinal odors to a ventilating-pipe. My improvements do not therefore comprehend or embrace such use of said film of water; but

What I claim as my invention is—

1. A water-closet, &c., provided with mechanism, substantially as shown and described, for continuously injecting into the closet, &c., a spray of water or sewer-gas absorbent, substantially as set forth.

2. The combination, with a water-closet, &c., of a spraying attachment and a pipe leading to a source of supply, whereby water or a sewer-gas absorbent is continuously sprayed into said closet, &c., as and for the purpose set forth.

In testimony whereof I affix my signature in presence of two witnesses.

CHAS. F. PIKE.

Witnesses:
CHAS. F. VAN HORN,
S. J. VAN STAVOREN.